Dec. 2, 1930.   W. F. BROGE   1,783,217
CARBURETOR
Filed Dec. 21, 1928    2 Sheets-Sheet 1
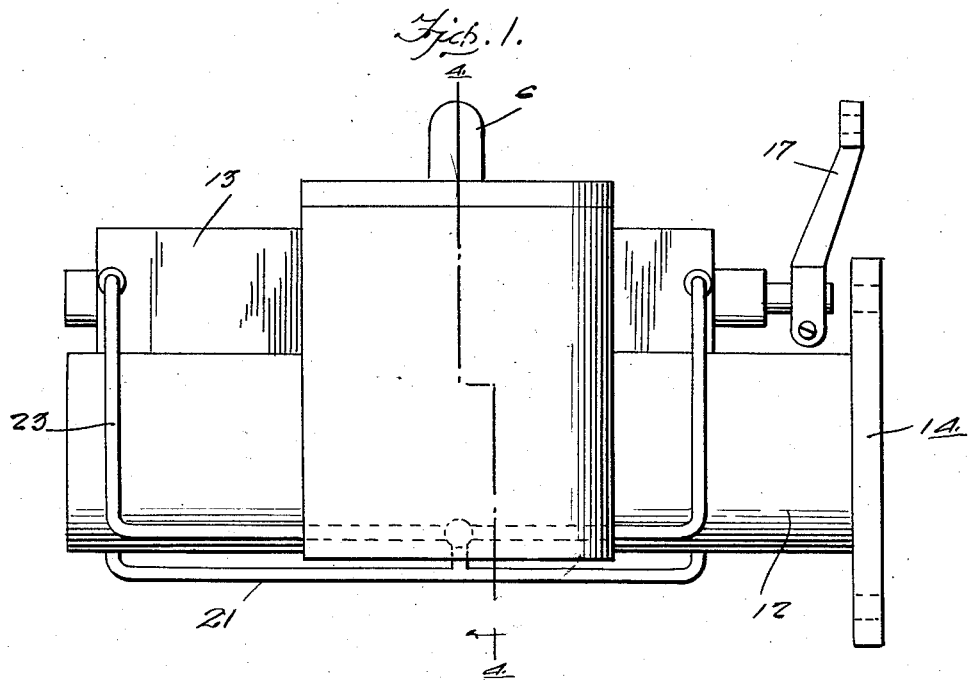
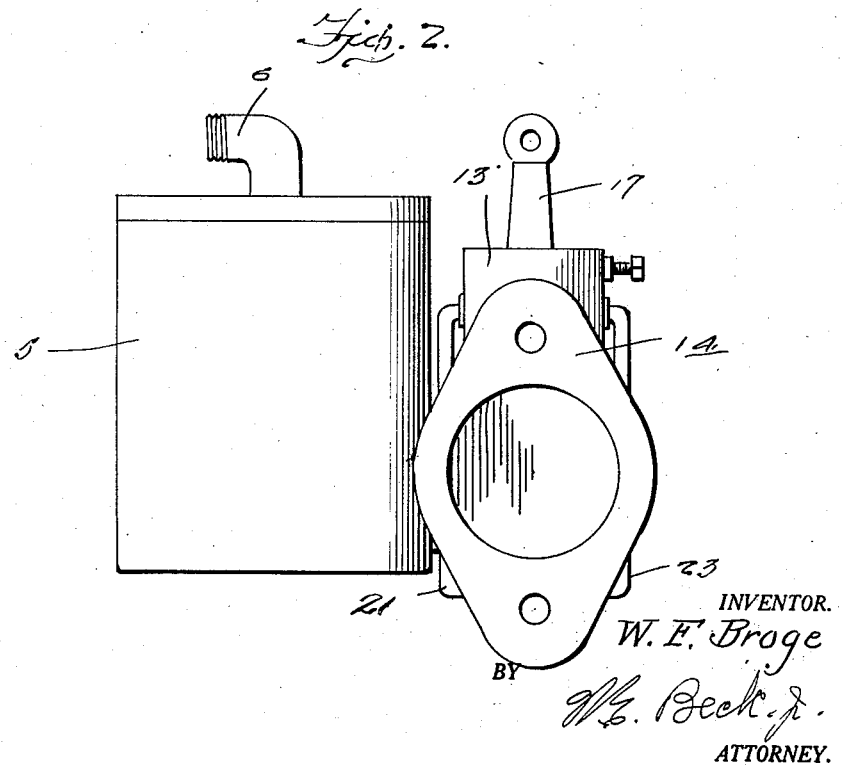
INVENTOR.
W. F. Broge
BY
ATTORNEY.

Dec. 2, 1930.  W. F. BROGE  1,783,217
CARBURETOR
Filed Dec. 21, 1928   2 Sheets-Sheet 2
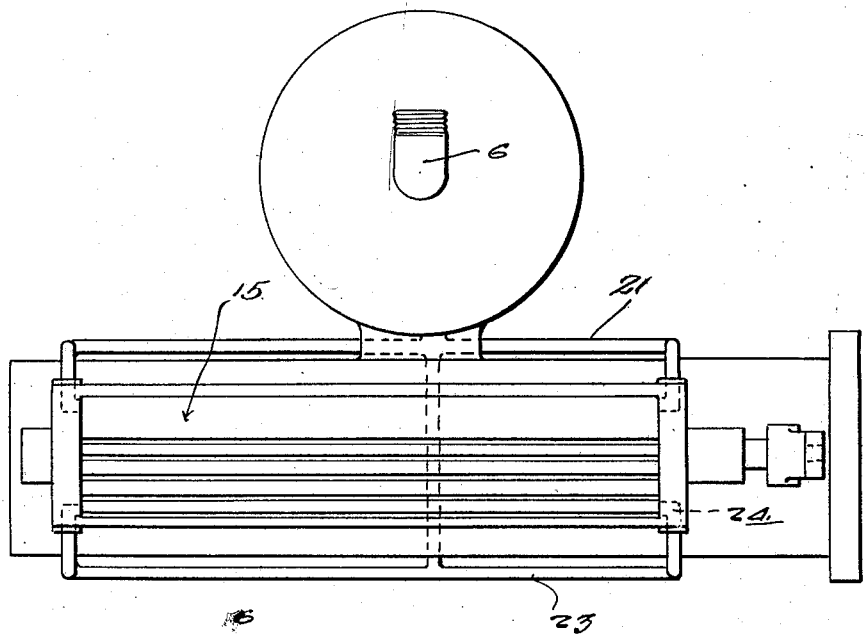
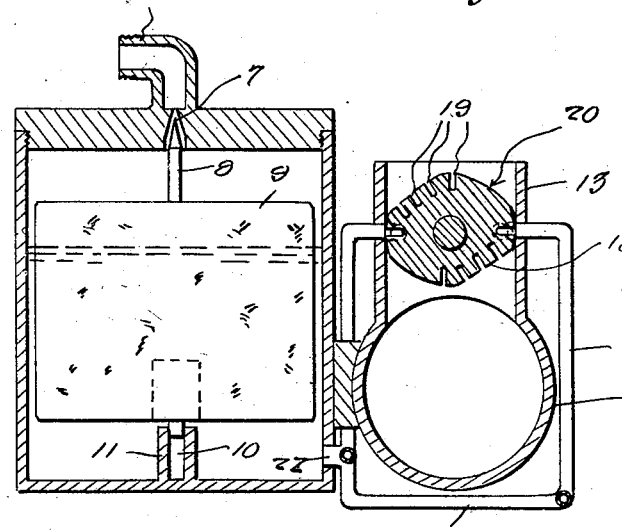
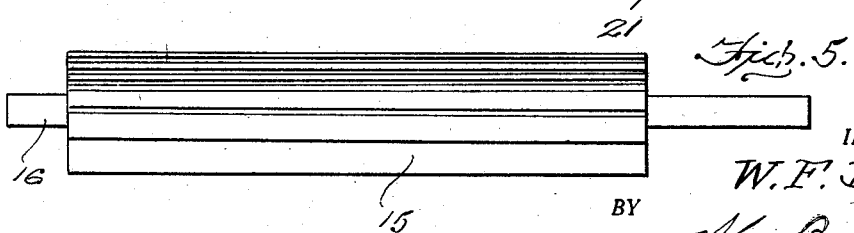
INVENTOR.
W. F. Broge
BY
W. E. Beck Jr.
ATTORNEY.

Patented Dec. 2, 1930

1,783,217

UNITED STATES PATENT OFFICE

WILLIAM F. BROGE, OF DETROIT, MICHIGAN, ASSIGNOR OF ONE-THIRD TO JOHN FRAME

CARBURETOR

Application filed December 21, 1928. Serial No. 327,719.

The present invention relates to carburetors adapted particularly for use in connection with internal combustion engines and has for its principal object to provide a novel structure for controlling the feeding of the liquid fuel into the mixing chamber whereby to cause a thorough co-mingling of the fuel with the air before the same is fed into the engine.

The invention comprises essentially the provision of a cylindrical member mounted for rotation in the upper portion of the mixing chamber and arranged during its rotation for cooperation with the side walls of the air intake end of the mixing chamber to control the volume of air admitted thereto. The cylindrical member embodies a novel construction for distributing the fuel throughout the length of the mixing chamber for uniform mixing with the air which comprises the formation of a series of longitudinally extending grooves in the opposite sides of the cylinder having connection with fuel pipes whereby to provide for the mixing of the fuel and the air through a precipitating action.

A still further object is to provide a carburetor of this character of an extremely simple and practical construction, which is efficient and reliable in operation, relatively inexpensive to manufacture and otherwise well adapted for the purposes for which the same is intended.

Other objects and advantages reside in the special construction, combination and arrangment of the various elements forming the invention, as more fully hereinafter described and claimed, reference being had to the accompanying drawings forming part hereof, wherein like numerals refer to like parts throughout the specification and in which Figure 1 is a side elevational view of the carburetor, Figure 2 is an end elevational view of the intake manifold attaching end thereof, Figure 3 is a top plan view, Figure 4 is a vertical transverse sectional view taken along a line 4—4 of Figure 1, and Figure 5 is a side elevational view of the cylindrical member.

Referring now to the drawings in detail, wherein for the purpose of illustration I have disclosed a preferred embodiment of the invention, the numeral 5 designates a float chamber having a nipple 6 extending from its upper end for attaching to a fuel feed pipe, communication through the top of the chamber being controlled by a conical opening 7 having a needle valve 8 disposed therein for seating in the opening and controlling communication therethrough. The needle valve extends upwardly from a float 9 arranged in the chamber, the lower end of the needle valve protruding from the bottom of the float and slidably inserted in a recess 10 formed in an upstanding boss 11 at the bottom of the chamber.

To one side of the float chamber is secured a mixing chamber 12 of tubular formation and disposed horizontally with its upper side open and provided with a pair of upstanding spaced walls 13 closed at each end and providing a throat through which air is admitted into the mixing chamber 12. One end of the mixing chamber is formed with a flange 14 for attaching to the intake manifold of the engine.

A cylindrical valve 15 is disposed longitudinally in the throat above the mixing chamber 12 with shaft ends 16 extending axially from each end of the valve and journalled for rotation in the opposite ends of the throat. An operating lever 17 is attached to one of the shaft ends 16.

The cylindrical valve 15 is flattened at diametrically opposite sides as shown at 18 and is provided at each of its flattened sides with a plurality of spaced longitudinally extending grooves 19. The remaining sides of the valve are rounded as shown at 20 and one or more of the grooves 19 are also formed in the rounded portion of the valve at each side of the flattened portions, as clearly illustrated in Figure 4 of the drawings. The valve is of a suitable diameter to provide for a substantially snug fit of the rounded sides of the valve with the pair of upstanding walls 13 so as to substantially close communication through the throat into the mixing chamber 12. The valve is constructed of a reduced diameter at its flattened sides so that it will be apparent that upon the rotation of the valve into a position with the flattened sides adjacent the walls 13, an air space will be formed at each side of the valve.

A fuel pipe 21 is attached at one end to a port 22 formed in one of the lower walls of the float chamber and extends outwardly therefrom longitudinally with respect to the mixing chamber toward each end thereof and has a branch pipe 23 attached to the pipe 21 disposed in parallel relation at opposite sides of the mixing chamber with the ends of said pipes extending through ports 24 formed in the respective ends of the walls 23 and adjacent each side thereof. The ports 24 enter the end walls of the throat in a position for communication with the respective ends of the grooves 19 of the opposite sides of the valve. Each of the grooves is adapted for selective register at each end with one of the ports 24 upon the rotation of the valve whereby the fuel from the pipes 20 and 23 will be discharged into said grooves. As will be observed from an inspection of Figure 4 of the drawing the ports 24 are positioned so as to register with the diametrically opposite grooves when the same are disposed in a horizontal plane so that the fuel will travel the full length of the cylindrical valve along said grooves.

In the operation of the device, as the suction from the motor draws the air downwardly through the throat above the mixing chamber, the fuel is sucked from the grooves and is precipitated in the mixing chamber with the air whereby to cause a thorough comingling therewith as the same passes through the mixing chamber into the intake manifold. By reason of the substantially snug fit of the rounded portion of the valve with the walls of the throat, the valve may be arranged in a position to admit a relatively small amount of air and fuel into the mixing chamber so as to enable the engine to run at a comparatively slow speed, as when idling, and by rotating the valve for moving the flattened sides of the same adjacent the walls an increased amount of fuel and air will be admitted for increasing the speed of the engine. It will be understood that a suitable air cleaner or screen may be fitted over the throat to prevent the entrance of dirt and dust into the engine with the air.

It is obvious that the invention is susceptible of various changes and modifications without departing from the spirit thereof or the scope of the appended claims, and I accordingly claim as my own all such forms of the invention to which I am entitled.

I claim:

1. A carburetor comprising a float chamber, a mixing chamber having a throat formed at one side thereof for admitting air into said last named chamber, a cylindrical valve rotatably mounted in the throat having its sides arranged for cooperation with the walls of the throat whereby to control the passage of air into the mixing chamber, longitudinally extending grooves formed in the sides of the valve for the entire length thereof and a fuel feed pipe extending from the float chamber and communicating with the ends of the groove for feeding fuel thereto for uniform discharge along the sides of the valve.

2. A carburetor comprising a float chamber, a mixing chamber having a throat formed at one side thereof for admitting air into said last named chamber, a cylindrical valve of irregular formation in cross section rotatably mounted in the throat having its sides arranged for cooperation with the walls of the throat whereby to uniformly control the passage of air into the mixing chamber at opposite sides of the valve, a plurality of grooves extending longitudinally along the sides of the valve throughout its length and disposed diametrically opposite with respect to each other whereby a pair of the grooves will be positioned in a horizontal plane with the axis of the valve during rotating movement of the valve and a fuel feed pipe communicating with the ends of the horizontally positioned grooves for uniformly discharging the fuel along the sides of the valve.

3. A carburetor comprising a float chamber, a tubular mixing chamber disposed horizontally with its upper side open and provided with upstanding spaced parallel walls closed at each end and forming a throat for the admission of air into the mixing chamber, a cylindrical valve horizontally disposed within the throat having its ends journalled for rotation in the ends of the throat, said valve having alternate flattened and rounded portions formed at diametrically opposite sides throughout its length and arranged for uniform cooperation with the walls of the throat for controlling the admission of air into the throat at opposite sides of the valve, a plurality of grooves extending longitudinally along the sides of the valve throughout its length and disposed diametrically opposite with respect to each other whereby a pair of the grooves will be positioned in a horizontal plane with the axis of the valve during rotating movement of the valve and a fuel feed pipe communicating with the ends of the horizontally positioned grooves for uniform discharge of the fuel along the sides of the valve.

4. A carburetor comprising a float chamber, a tubular mixing chamber disposed horizontally with its upper side open and provided with upstanding spaced parallel walls closed at each end and forming a throat for the admission of air into the mixing chamber, a cylindrical valve horizontally disposed within the throat having its ends journalled for rotation in the ends of the throat, said valve having flattened and rounded portions formed at diametrically opposite sides and arranged for cooperation with the walls of the throat for controlling the admission of air therethrough, feed pipes extending from the float chamber into the throat at each end thereof and a plurality of grooves formed at diametrically opposite sides of the valve and extending longitudinally thereof and arranged for selective communication at each end with said feed pipe whereby to precipitate the fuel into the mixing chamber throughout the entire length thereof during the passage of the air through the throat.

In testimony whereof I affix my signature.

WILLIAM F. BROGE.